(12) United States Patent
Watanabe et al.

(10) Patent No.: US 7,537,257 B2
(45) Date of Patent: May 26, 2009

(54) STOWABLE CARGO POCKET PROVIDING WALL ASSEMBLY AND METHOD

(75) Inventors: Makoto Watanabe, Kanagawa-ken (JP); Shigeya Sekiguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/782,862

(22) Filed: Jul. 25, 2007

(65) Prior Publication Data
US 2008/0029986 A1 Feb. 7, 2008

(30) Foreign Application Priority Data
Aug. 2, 2006 (JP) ............... 2006-210851

(51) Int. Cl.
*B60P 3/00* (2006.01)
(52) U.S. Cl. .............................. 296/24.46; 296/37.16
(58) Field of Classification Search .............. 296/24.46, 296/37.16, 66, 24.43, 37.5, 37.15
See application file for complete search history.

(56) References Cited

U.S. PATENT DOCUMENTS

| | | | | |
|---|---|---|---|---|
| 4,502,674 A | * | 3/1985 | White et al. ............. | 296/37.16 |
| 5,011,208 A | * | 4/1991 | Lewallen .................. | 296/37.16 |
| 5,618,077 A | * | 4/1997 | Ament et al. ............. | 296/37.16 |
| 5,632,520 A | * | 5/1997 | Butz ........................ | 296/24.43 |
| 5,947,358 A | * | 9/1999 | Wieczorek ............... | 296/37.16 |
| 6,099,222 A | * | 8/2000 | Moore ...................... | 296/37.16 |
| 6,183,177 B1 | * | 2/2001 | Dahlgren .................... | 410/100 |
| 6,349,986 B1 | * | 2/2002 | Seel et al. ................. | 296/37.16 |
| 6,843,518 B2 | * | 1/2005 | Schlecht et al. .......... | 296/24.34 |
| 6,930,592 B2 | * | 8/2005 | Schlecht et al. ........ | 340/426.29 |
| 7,014,239 B2 | * | 3/2006 | Ehrenberger ............. | 296/37.16 |
| 7,445,262 B2 | * | 11/2008 | Zaiser et al. ............. | 296/24.43 |
| 2008/0093874 A1 | * | 4/2008 | Partch ...................... | 296/37.15 |

FOREIGN PATENT DOCUMENTS

JP 11-59278 A 3/1999

* cited by examiner

*Primary Examiner*—Kiran B. Patel
(74) *Attorney, Agent, or Firm*—Foley & Lardner LLP

(57) ABSTRACT

A stowable wall assembly, for providing a cargo pocket in a vehicle having two adjacent seats spaced from each other to define therebetween a space within a passenger compartment, is provided. The wall assembly includes at least two wall members adapted to be stowed in respective storage positions, each of the wall members being configure to have a deployed position extending into the passenger compartment to provide a partition wall for the space.

9 Claims, 8 Drawing Sheets

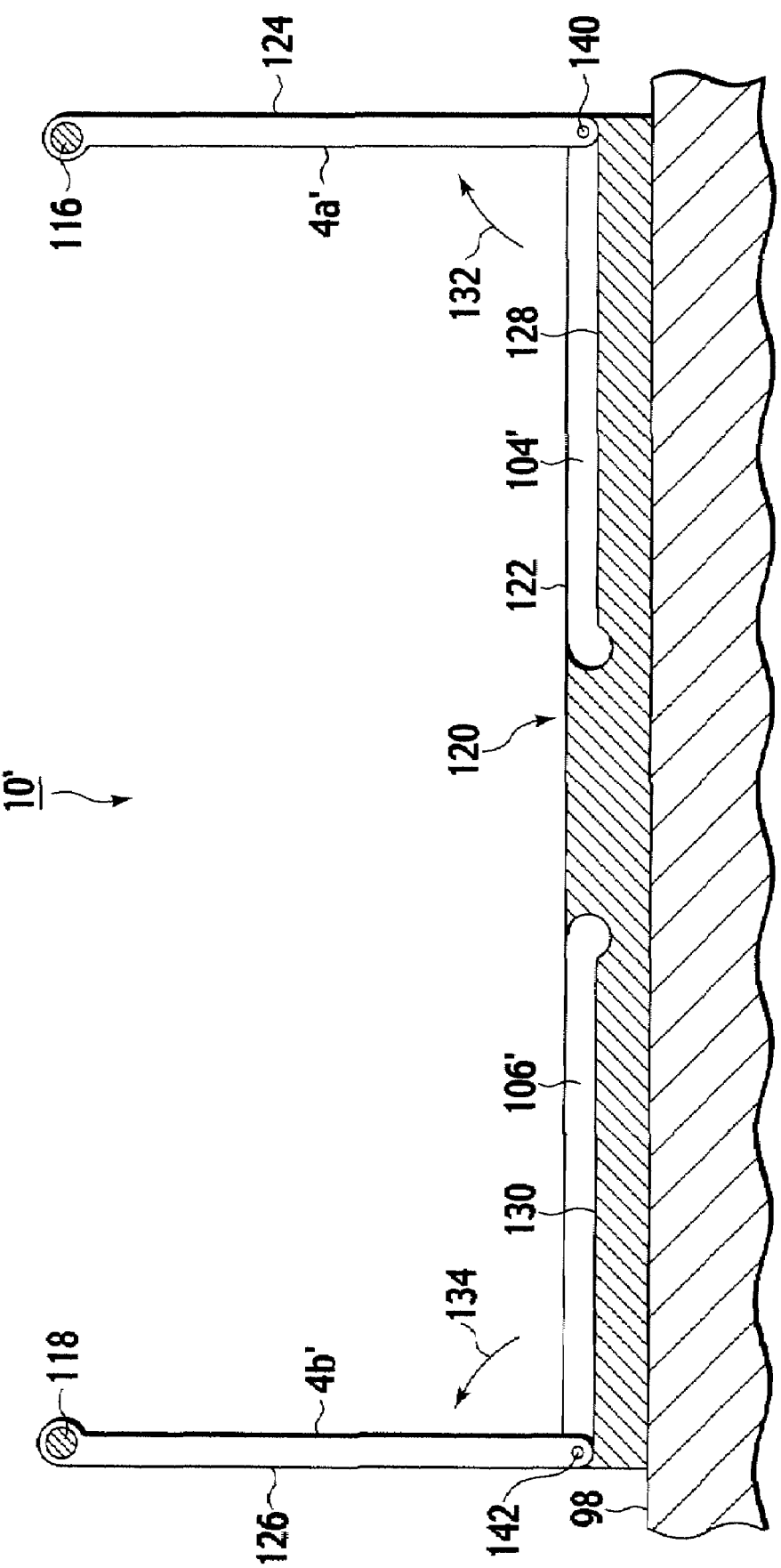

US 7,537,257 B2

STOWABLE CARGO POCKET PROVIDING WALL ASSEMBLY AND METHOD

BACKGROUND OF THE INVENTION

1. Related Co-Pending Application

The present application claims the benefit of priority from Japanese Patent Application No. 2006-210851, filed Aug. 2, 2006 in Japan, the disclosure of which is hereby incorporated by reference in its entirety.

2. Field of the Invention

The present invention relates, in general, to assemblies and methods for providing cargo pockets in vehicles, and more particularly to wall assemblies and methods for providing cargo pockets in vehicles.

3. Description of Related Art

Conventionally, a console box is fixedly mounted to the floor of a passenger compartment of a vehicle to fill a space between two seats, for example a driver's seat and a front passenger's seat, for providing a cargo pocket (see JP-A 11-59278).

However, immovably setting a console box within the space between the two seats makes it difficult for passengers to move through this space.

The present invention has been made in view of the recognition of the above-mentioned problem.

As used herein, the expression "vehicle" shall include motor vehicles, such as sport utility vehicles (SUVs), vans, automobiles, buses, watercraft, aircraft, trains, even golf carts, and equivalent motored vehicles or towed or unpowered carriers, such as trailers and equivalent unpowered vehicles.

An object of the present invention is to make gooduse of a space between two seats within a vehicle by normally utilizing the space as a region for passengers to move through, but utilizing it as a cargo pocket.

SUMMARY OF THE INVENTION

In one aspect of the present invention, there is provided a stowable wall assembly in combination with a vehicle having two adjacent seats spaced from each other to define therebetween a space within a passenger compartment. The assembly comprises: at least two wall members adapted to be stowed in respective storage positions, each of the wall members being configured to have a deployed position extending into the passenger compartment to provide a partition wall for the space.

BRIEF DESCRIPTION OF THE DRAWINGS

FIG. 11 is a cross section view corresponding to FIG. 2 of an alternative embodiment of the wall assembly with relatively inflexible wall members shown in deployed positions.

DETAILED DESCRIPTION OF THE INVENTION

Figure 1:
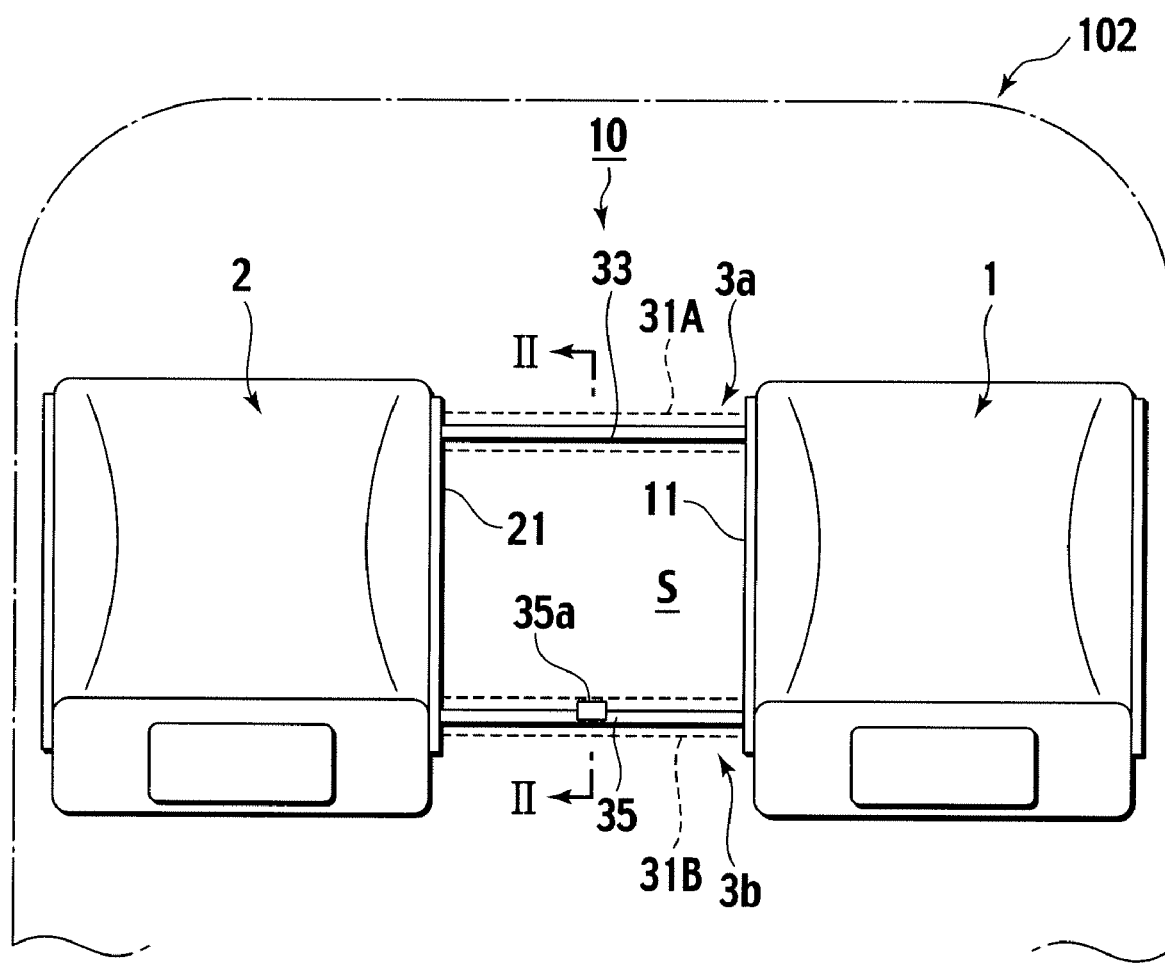
FIG. 1 is a fragmentary plan view of a vehicle having a stowable wall assembly constructed according to the present invention when stowed.

A stowable accessory restraining wall assembly of the present invention is particularly well suited for making gooduse of a space, which is defined between two adjacent seats arranged side by side in a passenger compartment of a vehicle. The wall assembly comprises at least two wall members stowed in respective storage positions. Each of the wall members has a deployed position extending into the passenger compartment to provide a partition wall for the space.

<Structure>

Referring to the drawings, a preferred embodiment of a stowable accessory restraining wall assembly, generally designated 10, incorporating the principles of the present invention is illustrated. Wall assembly 10 includes two wall members 4a and 4b. In the embodiment, each of the wall members 4a and 4b is provided as a flexible wall member, such as a membrane, web or sheet of material. Flexible wall members 4a and 4b can be seen in FIGS. 1 and 2 to be stowed out of sight.

Figure 2:
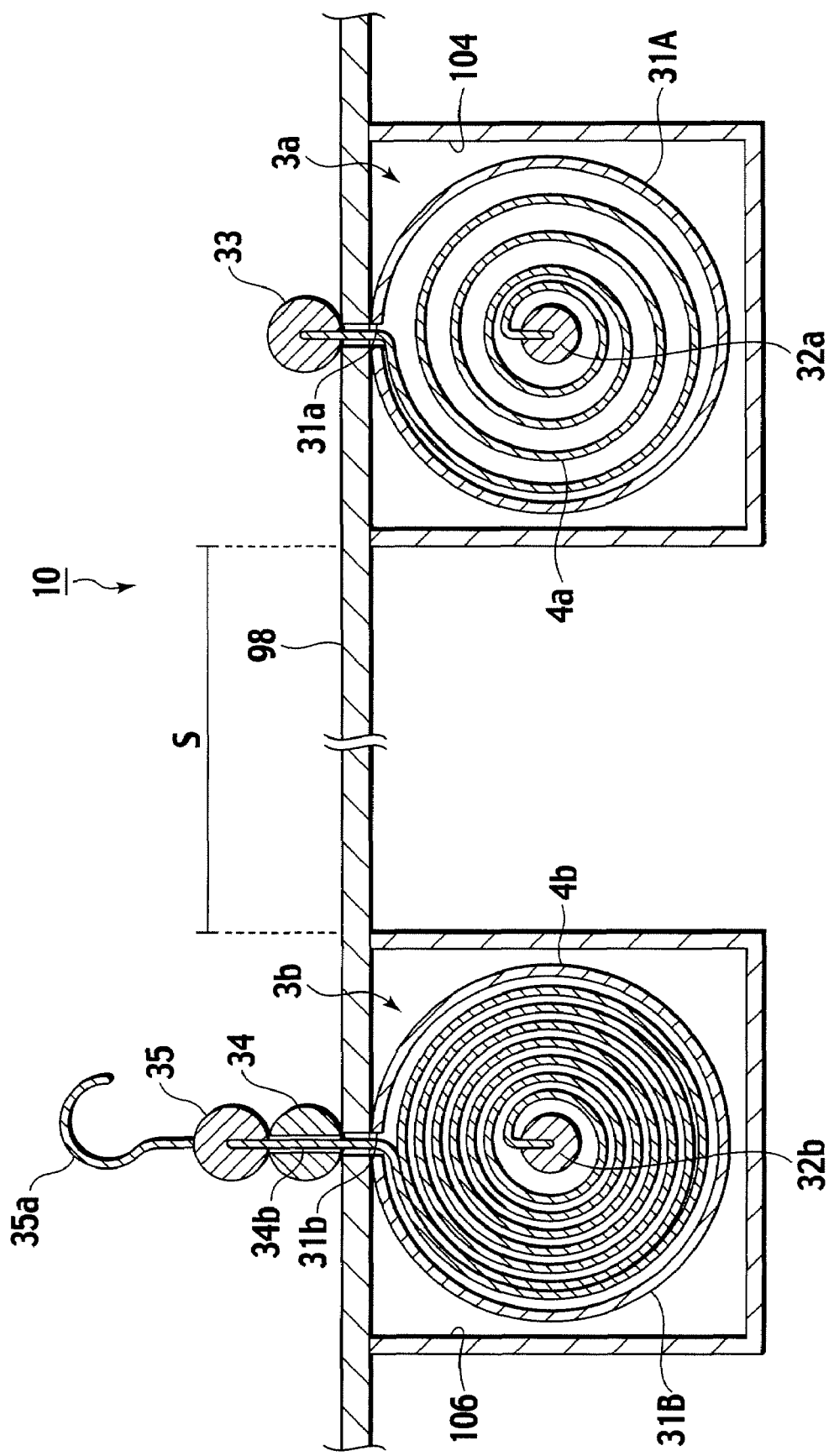
FIG. 2 is a magnified view of portions of a cross section view taken through the line II-II in FIG. 1.

In the stowed position depicted in FIGS. 1 and 2, flexible wall members 4a and 4b are stored under the floor 98 of a passenger compartment 100 of a vehicle 102, leaving a space S defined between two adjacent seats 1 and 2, for example a driver's seat and a front passenger seat, substantially unobstructed for normal use of space S as a region for passengers to walk through. Wall member 4a is located near a fore limit of space S, and wall member 4b near an aft limit of space S.

Unrolling wall member 4a may be accomplished by grasping an exposed rod-like or tubular end member 33, which acts as a handle. Unrolling wall member 4b may be accomplished by grasping an exposed rod-like tubular end member 34, which acts as a handle. The user pulls on member 33, unrolling wall member 4a from an axle or roller 32a, which is rotatably mounted to vehicle 102 in storage cavity 104 under floor 98. The user pulls on member 34, unrolling wall member 4b from an axle or roller 32b, which is rotatably mounted to vehicle 102 in storage cavity 106 under floor 98.

Figure 3A:
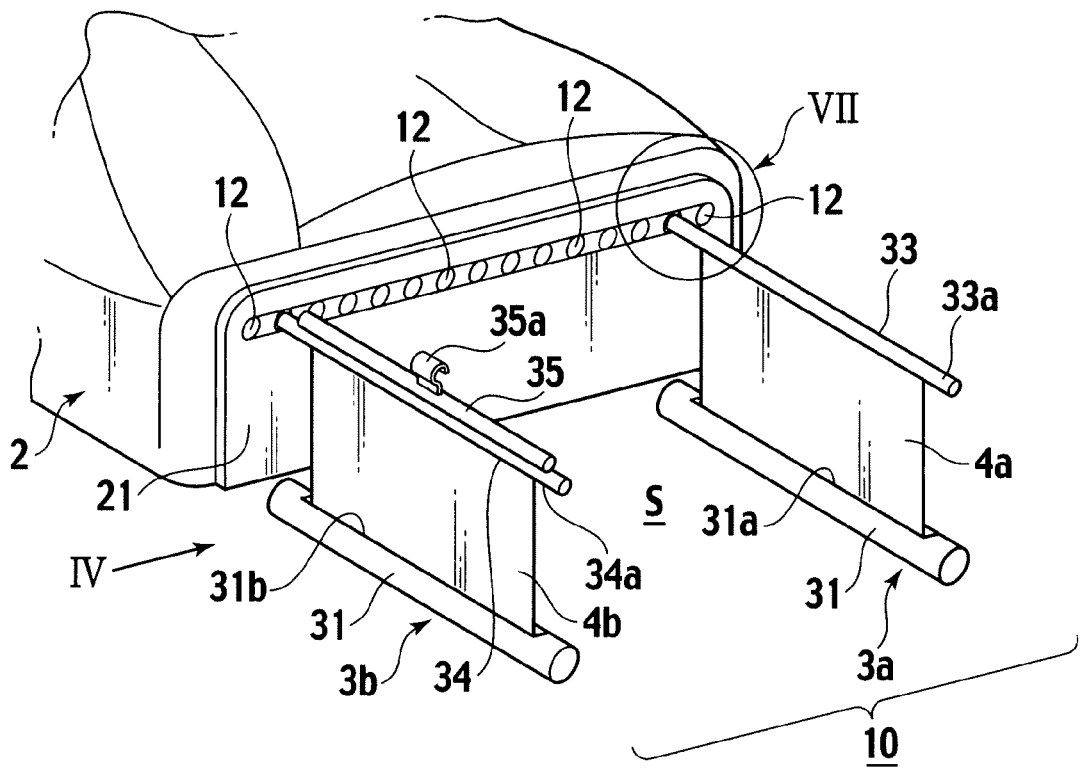
FIG. 3A is a partially broken, with unnecessary portions removed, fragmentary top perspective view of the invention of FIG. 1 with one of the wall members in a fully unrolled and fully deployed position and the other wall member in a partially unrolled but fully deployed position.

As may be seen in FIGS. 3A, 3B, 4-9, attached to or formed on the ends of rod-like or tubular member 33 are protruding coupler members 33a, and attached to or formed on the ends of rod-like or tubular member 34 are protruding coupler members 34a. When wall member 4a is in an upright deployed position, as shown in FIG. 3A, two coupler members 33a cooperatively releasably engage with other coupler members 11 and 21 affixed to seats 1 and 2. When wall member 4b is in an upright deployed position, as shown in FIG. 3A, two coupler members 34a cooperatively releasably engage with other coupler members 11 and 21. Apertures or holes or bores 12 formed in other coupler members 11 and 21, open to space S so as to couple with coupler members 33a and 34a The cooperation between respective coupler members 33a, 11, and 21 releasably retains wall member 4a in the deployed position. The cooperation between respective coupler members 34a, 11, and 21 releasably retains wall member 4b in the deployed position. Thus, in the unrolled vertical positions shown in FIG. 3A, flexible wall members 4a and 4b form front and rear partition walls between seats 1 and 2. The front and rear partition walls form a cargo pocket for seats 1 and 2 of passenger compartment 100. Such a configuration of wall members 4a and 4b can be readily accessed by seat occupants sitting in seats 1 and 2 and used to store objects for convenient retrieval by the seat occupants.

Flexible wall members 4a and 4b are here illustrated as being mounted in rolled up conditions in storage cavities 104 and 106, which are provided as original equipment under floor 98 of passenger compartment 100.

In a broad aspect of the present invention, flexible wall members 4a and 4b also could be stored in storage cavities formed in a floor liner structure (see FIG. 11) positioned in abutting relation against floor 98 of space S. Mounting of wall members 4a and 4b in storage cavities of the floor liner structure allows easy retrofitting of existing vehicles with the wall assembly of the present invention.

The detailed construction of wall assembly 10 can be described in more detail with reference to FIG. 2. In the fully stowed position shown in FIG. 2, the totality of flexible wall member 4a is rolled up about axle 32a rotatably mounted to a housing 31A of a rewind device 3a, and the totality of flexible wall member 4b is rolled up about axle 32b rotatably mounted to a housing 31B of a rewind device 3b. Gate storage cavity 104 is sized to be sufficiently large to accept housing 31A of rewind device 3a, and gate storage cavity 106 is sized to be sufficiently large to accept housing 31B of rewind device 3b. As best shown in FIG. 2, housings 31A and 31B are cylindrical housings, respectively. Coupled between housing 31A (or vehicle 102) and axle 32a is a spring biasing mechanism using, for example a spiral spring. Coupled between housing 31B (or vehicle 102) and axle 32b is a spring biasing mechanism using, for example a spiral spring. The spring biasing mechanisms bias axles 32a and 32b, and thus flexible wall members 4a and 4b to roll up into storage cavities 104 and 106 when wall assembly 10 is not being used. Each of flexible wall members 4a and 4b is, therefore, biased toward a stowed position in which it is completely stored about axle 32a or 32b. The spring biasing retraction mechanisms are well known to those skilled in the mechanical arts and will not be described in detail herein. If desired, the biasing mechanism may include a locking-releasable ratchet-type locking assembly that can reduce tension on flexible wall member 4a or 4b when in the fully deployed position shown in FIG. 3A or 3B. Spring biasing is not an absolute requirement of the flexible embodiment of the present invention since manual or powered roller cranking assemblies also could be employed. Wall member 4a can be withdrawn to extend into space S of passenger compartment 100 via a slot-like opening in floor 98 and a mating slot-like opening 31a in housing 31A. Wall member 4b can be withdrawn to extend into space S of passenger compartment 100 via a slot-like opening in floor 98 and a mating slot-like opening 31b in housing 31B.

Figure 3B:
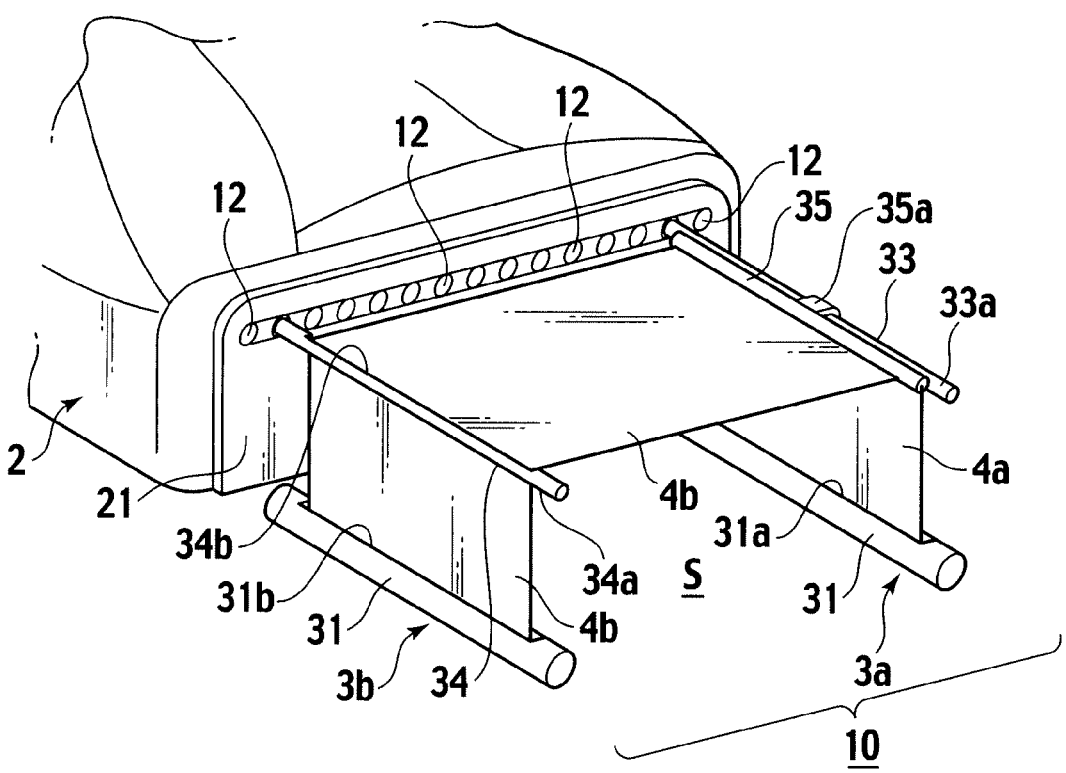
FIG. 3B is a partially broken, with unnecessary portions removed, fragmentary top perspective view of the invention of FIG. 1 with the other wall member in a fully unrolled position.
Figure 4:
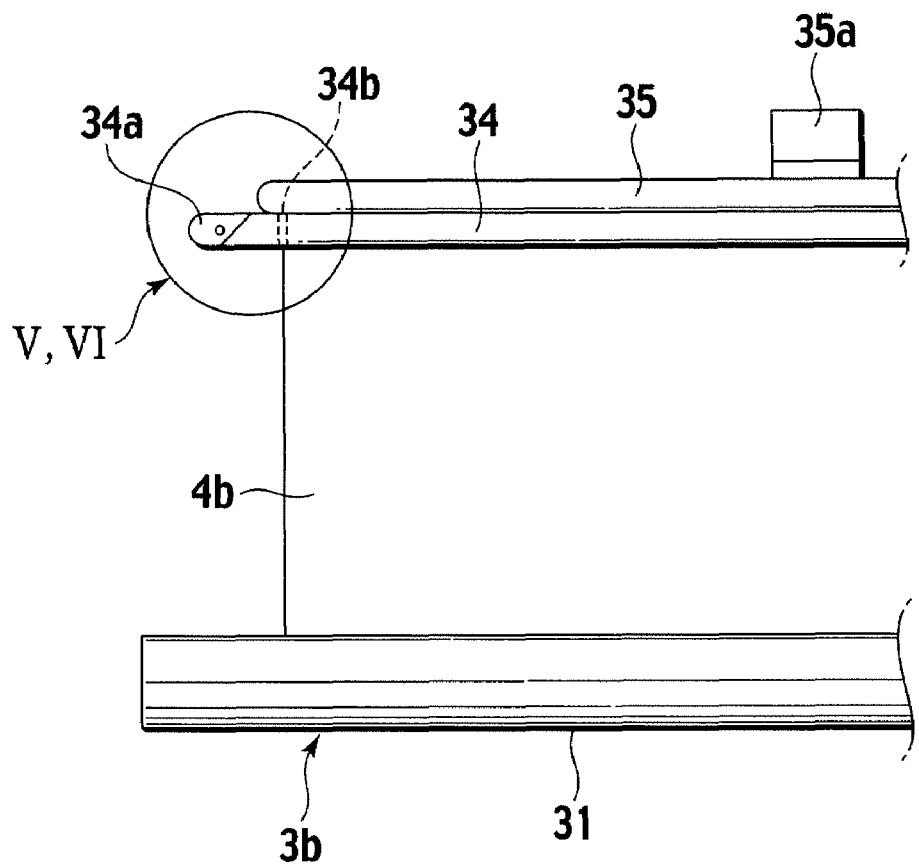
FIG. 4 is a fragmentary view of FIG. 3A as viewed along an arrow IV.

With reference also to FIG. 3B, flexible wall member 4b near the aft limit of space S and rolled up by rewind device 3b is longer than wall member 4a near the fore limit of space S and rolled up by rewind device 3a.

An edge of flexible wall member 4a is fixedly attached to rod-like member 33. Flexible wall member 4b passes through a slot-like opening 34b formed in rod-like member 34. An edge of flexible wall member 4b preferably includes at least one coupling device such as an anchor hook 35a on an end member 35 to which the edge of flexible wall member 4b is fixedly attached. In the embodiment, end member 35 is a rod-like member and hook 35a is disposed at a mid portion between ends of rod-like end member 35 enabling hook 35a to be releasably secured to a complementary exterior surface of rod-like end member 33 of flexible wall member 4a. If desired, hook 35a may be releasably secured to a complementary coupling eye or loop on the exterior surface of rod-like end member 33. The roles of hook and loop could be interchanged, for example, hook 35a could instead be a loop, and the loop could instead be a hook. Rod-like end member 35 has a role of preventing rod-like member 34 from falling off flexible wall member 4b. If desired, anchor hook 35a may have this role. In this case, rod-like end member 35 is no longer needed.

As shown in FIGS. 3A, 3B, 4 to 9, rod-like member 33 includes protruding coupler members 33a and rod-like member 34 includes protruding coupler members 34a. Each of protruding coupler members 33a and 34a is coupled by pivot a (see FIGS. 6 and 9) to the corresponding rod-like member 33 or 34 and configured such that it is spring loaded to assume a horizontally oriented position but it can pivot from the horizontally oriented position to a downwardly angled position less than 90 degrees. A distance between the two pivots a of each of rod-like members 33 and 34 exceeds a width of the associated flexible wall member 4a or 4b so that protruding coupler members 33a and 34a can protrude beyond side edges of the associated flexible wall member 4a or 4b.

Figure 5:
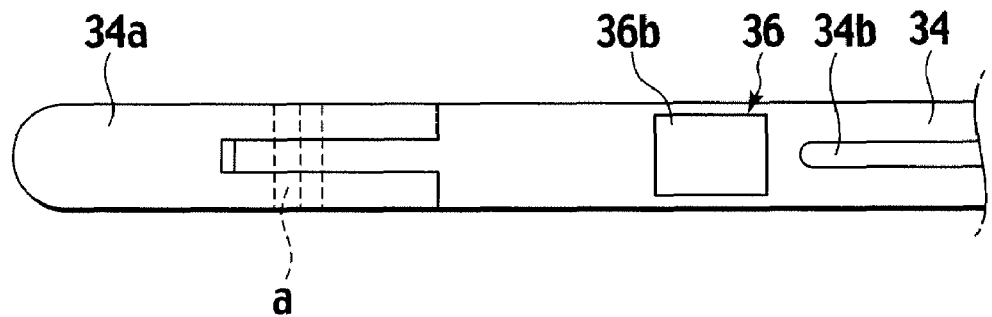
FIG. 5 is a fragmentary top plan view of a portion surrounded by a circle designated V, VI (V is applicable) in FIG. 4.
Figure 6:
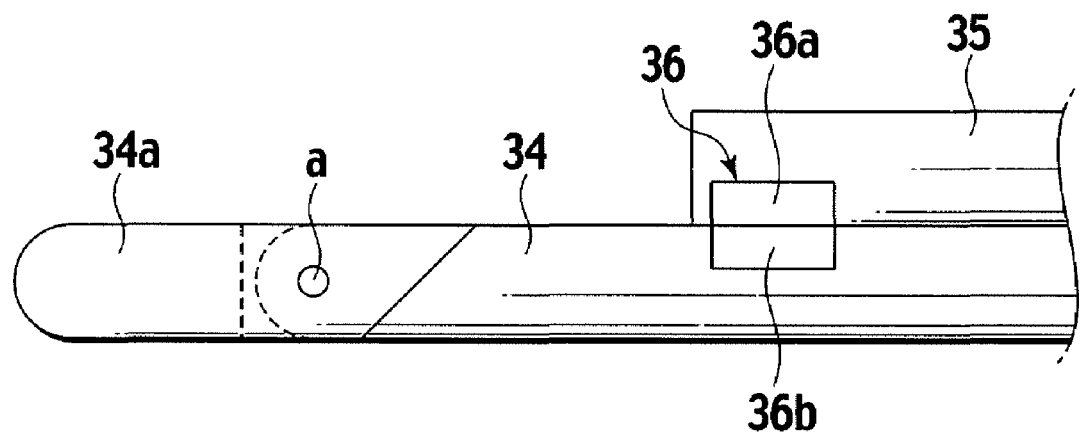
FIG. 6 is a fragmentary front elevation view of the portion surrounded by the circle V, VI (VI is applicable) in FIG. 4.

Attached to rod-like end member 35 and rod-like member 34 are a male part 36a and a mating female part 36b of a fastener 36 made of cloth (see FIGS. 5 and 6).

In the illustrated deployed positions in FIG. 3A, protruding coupler members 33a and 34a, which are located near seat 2, cooperatively releasably engage with an attachment support coupler member 21, and protruding coupler members 33a and 34a, which are located near seat 1, cooperatively releasably engage with another attachment support coupler member 11 (see FIG. 1 also). In the embodiment, attachment support coupler member 11 forms a part of a seat side cover for seat 1, and attachment support coupler member 21 forms a part of a seat side cover for seat 2. A plurality of apertures 12, which are formed in each of attachment support coupler members 11 and 21 to couple with protruding coupler members 33a and 34a, are located or positioned equidistant in line along directions in which the two partition walls for the space S face each other (see FIG. 3A). In the embodiment, these directions are fore-and-aft directions of vehicle 102.

Such plurality of apertures 12 of each of attachment support coupler members 11 and 21 communicate one after another via ribs 13 that prevent free movement of the associated one protruding coupler members 33a and 34a of rod-like members 33 and 34 between the adjacent two of plurality of apertures 12. The ribs 13 are configured in height or elasticity such that the free movement is possible when the rod-like member 33 or 34 is pressed by power of at least a predetermined amount power.

Figure 7:
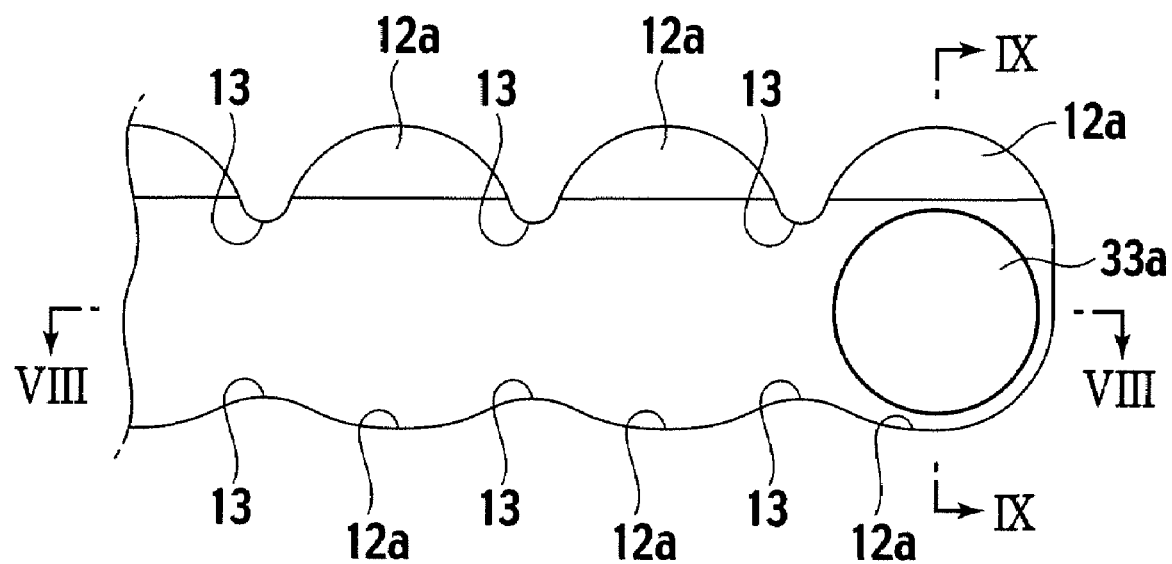
FIG. 7 is a fragmentary view of a portion surrounded by a circle designated VII in FIG. 3A.
Figure 8:
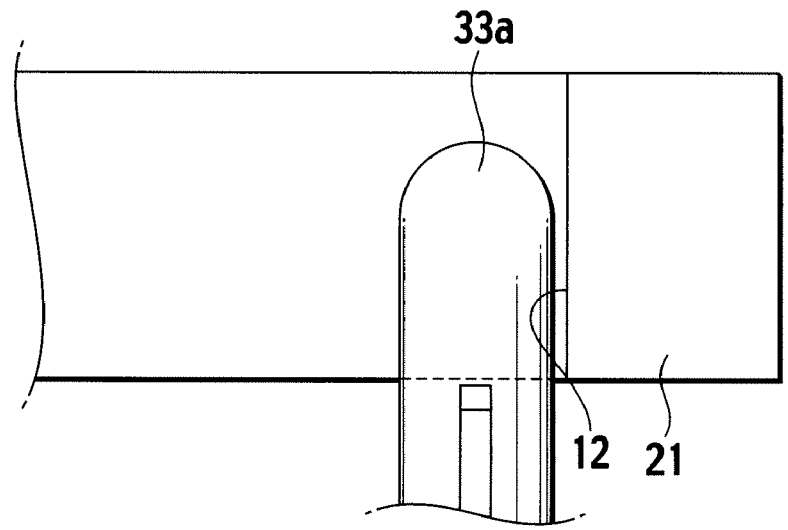
FIG. 8 is a cross section view taken though the line VIII-VIII in FIG. 7.
Figure 9:
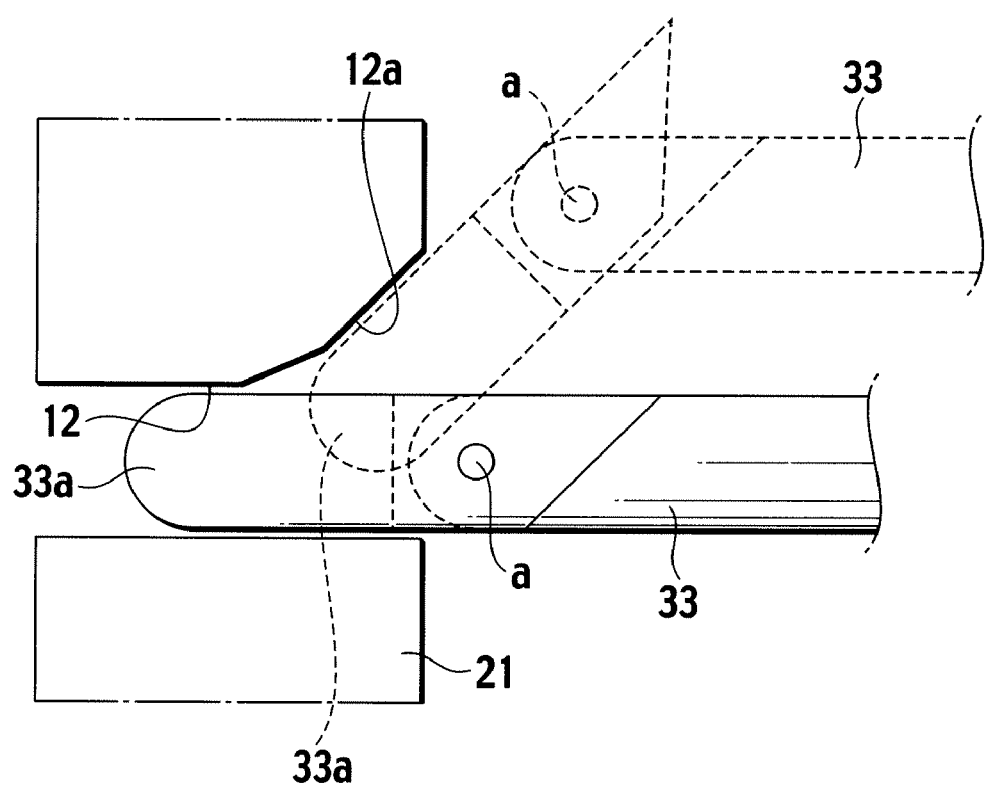
FIG. 9 is a cross section view taken through the line IX-IX in FIG. 7.

As shown in FIGS. 7 and 9, in order to facilitate insertion of protruding coupler member 33a or 34a into one of plurality of apertures 12, a cylindrical bearing surface 12a extends along an upwardly angled line to catch the protruding coupler member 33a or 34a in its downwardly angled position as indicated by dotted lines in FIG. 9.

<Operation and Effect>

Description on operation and effects of the embodiment follows:

As shown in FIGS. 1 and 2, when there is no need to store objects, for example small and light articles, flexible wall members 4a and 4b are rolled up by rewind devices 3a and 3b, leaving space S between seats 1 and 2 within passenger compartment 100 substantially unobstructed for normal use of space S as region for passengers to walk through.

When there is need to store objects, a user (not shown) pulls on rod-like members 33 and 34 to begin withdrawing or unrolling flexible wall members 4a and 4b from rewind devices 3a and 3b within storage cavities 104 and 106 to deploy them in positions more or less vertical to the plane of floor 98. In FIG. 3A, the user has inserted protruding coupler members 33a and 34a into apertures 12 of attachment support coupler members 11 and 21 of seat side cover for seats 1 and 2, and cooperation between protruding coupler members 33a and 34a with apertures 12 releasably retain flexible wall members 4a and 4b in the illustrated deployed positions. In the illustrated deployed positions, flexible wall members 4a and 4b form front and rear partition walls between seats 1 and 2. The front and rear partition walls provide a cargo pocket for seats 1 and 2. This cargo pocket can be readily accessed by seat occupants sitting in seats 1 and 2 and used to store objects.

If desired to cover the cargo pocket, the user pulls on rod-like end member 35 to horizontally extend flexible wall member 4b in a forward direction of vehicle 102 toward rod-like member 33. In FIG. 3B, the user has hooked anchor hook 35a on rod-like member 33 of wall member 4a and rod-like members 35 and 33 are in abutting relation. In this manner, the cargo pocket is covered.

Figure 10A:
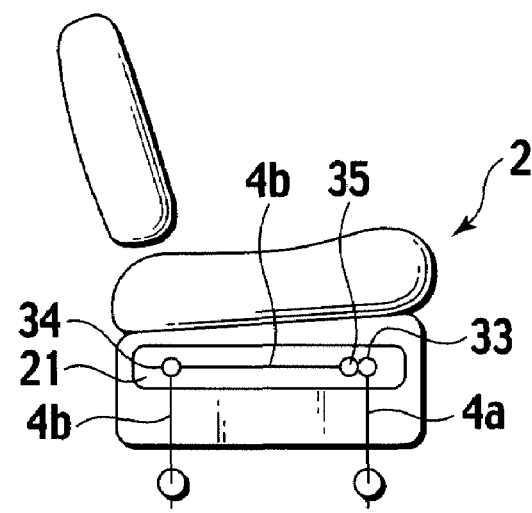
FIGS. 10A, 10B and 10C are views illustrating the relation between stowable wall assembly and seats.
Figure 10B:
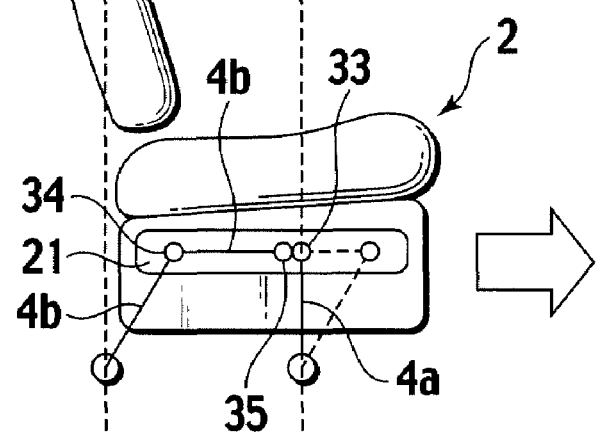
Figure 10C:
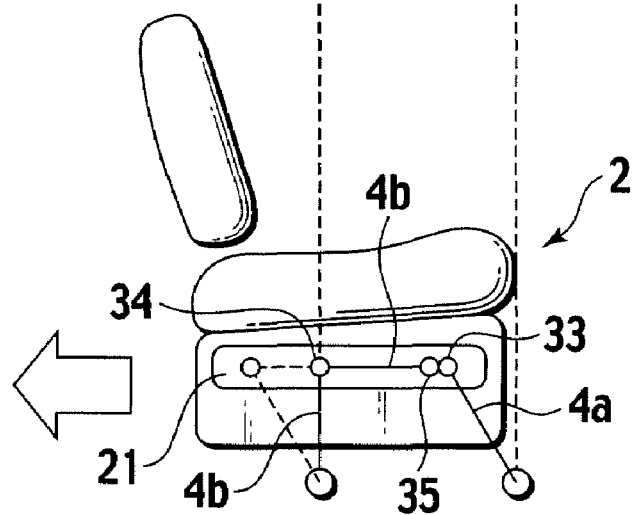

In FIG. 10A, wall assembly 10 is in the fully unrolled and fully deployed condition. When seats 1 and 2 move from the position shown in FIG. 10A to a forward position shown in FIG. 10B or a rearward position shown in FIG. 10C, wall members 4a and 4b are inclined and twisted as indicated by dashed line. The state of being inclined and twisted can be alleviated by changing the position at which protruding coupler members 33a of rod-like member 33 or protruding coupler members 34a of rod-like member 34 engage with apertures 12 of attachment support coupler members 11 and 21.

Changing the position is accomplished by moving at least one of rod-like members in fore-and-aft directions of vehicle 102 to new ones of plurality of apertures 12 from the old ones past ribs 13.

In the embodiment thus far described, two wall members 4a and 4b are stowed in respective storage cavities 104 and 106 under floor 98 of vehicle 102 for normal use of space S between two seats 1 and 2 as region for passengers to walk through, but two wall members 4a and 4b can be deployed from respective storage cavities 104 and 106 under floor 98 to form two partition walls between two seats 1 and 2 for use of space S as a cargo pocket for seat occupants sitting in two seats 1 and 2.

In addition, wall members 4a and 4b, which can be withdrawn or unrolled from rewind device 3a located near fore limit of space S and rewind device 3b located near aft limit of space S, include rod-like members 33 and 34, respectively. Rod-like members 33 and 34 are inserted into apertures 12, serving as attachment supports, fixedly provided on vehicle 102, to retain wall member 4a and 4b in respective deployed positions to form partition walls between two seats 1 and 2. When there is no need for a cargo pocket and wall assembly 10 is not being used, wall members 4a and 4b are rolled up by respective rewind devices 3a and 3b for compact storages thereof under floor 98.

In addition, apertures 12 are formed in attachment support coupler members 11 and 21 forming parts of seat side covers for seats 1 and 2. This configuration provides a reduction in cost as compared to the case in which attachment support coupler members 11 and 21 are independent from seat side covers for seats 1 and 2.

In addition, the state of wall members 4a and 4b being inclined and twisted, which occurs when seats 1 and 2 have moved in fore-and-aft directions of vehicle 102, can be alleviated by changing the position at which protruding coupler members 33a of rod-like member 33 or protruding coupler members 34a of rod-like member 34 engage with apertures 12 of attachment support coupler members 11 and 21.

In addition, each of protruding coupler members 33a and 34a of rod-like member 33 or 34 is spring loaded to assume a horizontally oriented position but it can pivot from the horizontally oriented position to a downwardly angled position. Insertion of protruding coupler member 33a or 34a into one of apertures 12 is facilitated by providing cylindrical bearing surface 12a that extends along an upwardly angled line to catch the protruding coupler member 33a or 34a as downwardly angled.

When a user lifts rod-like member 33 or 34, protruding coupler member 33a or 34a slide in abutting relation with attachment support coupler members 11 and 21 (of seat covers for seat 1 or 2) and keep taking their downwardly angled positions. The user gets a hand off rod-like member 33 or 34 when protruding coupler member 33a or 34a begin entering the corresponding apertures 12 as indicated by the dashed line in FIG. 9. Then, rod-like member 33 or 34 is pulled downwardly due to its own weight and tension caused by power to roll up wall member 4a or 4b. Protruding coupler member 33a or 34a extend deeply into apertures 12 to take the respective horizontally oriented positions to retain rod-like member 33 or 34 in the fully illustrated position in FIG. 9.

In addition, changing the position is accomplished by moving at least one of rod-like members 33 or 34 in fore-and-aft directions of vehicle 102 to new ones of apertures 12 from the old ones past ribs 13 without any requirement to disengage rod-like member 33 or 34 out of apertures 12.

In addition, a user can cover a cargo pocket easily by pulling on rod-like end member 35 to horizontally extend flexible wall member 4b in a forward direction of vehicle 102 toward rod-like member 33 and hooking anchor hook 35a on rod-like member 33 of wall member 4a because wall member 4b passes through slot-like opening 34b of rod-like member 34, the edge of wall member 4b is attached to rod-like end member 35, and anchor hook 35a is provided on rod-like end member 35.

In addition, pulling on anchor hook 35a lifts rod-like members 35 and 34 together because of the provision of fastener 36 made of cloth. Male and female parts 36a and 36b of fastener 36 interconnect rod-like members 35 and 34. This configuration provides enhanced efficiency in operation.

In a modified embodiment of the wall assembly 10, attachment support coupler members 11 and 21 formed with apertures 12 are separated from seat side covers for seats 1 and 2. In this case, deployed positions of wall members 4a and 4b are retained when seats 1 and 2 move in fore-and-aft directions of vehicle 102.

In another modified embodiment of the wall assembly 10, wall members 4a and 4b are stored under floor 98 in generally parallel relation to the plane of floor 98.

In the embodiments thus far described, wall members 4a and 4b have been sufficiently flexible to be rolled-up about a roller or axle. Flexible wall members 4a and 4b could be fabricated from a flexible nylon or plastic sheet, from a natural or synthetic fabric material, from a flexible metal sheet or mesh, among other materials.

In the alternative embodiment of the wall assembly of the present invention shown in FIG. 11, a stowable wall assembly, generally designated 10', is provided which includes a floor liner structure 120, a relatively inflexible or rigid wall member 4a', and a relatively inflexible or rigid wall member 4b'. Floor liner structure 120, which is mounted within a passenger compartment 100 of a vehicle 102, is sized and shaped to fit within a space S between two seats 1 and 2. Upper edges of wall members 4a' and 4b' preferably, but necessarily, include manual engageable handle portions 116 and 118. In this embodiment, rigid wall members 4a' and 4b' lie flat atop floor liner 120 when stowed away. A storage cavity 104' and a storage cavity 106' are formed in an upper surface 122 of floor liner structure 120 such that when stowed, the outwardly facing surfaces 124 and 126 of deployed wall members 4a' and 4b' lie substantially flush with uppermost surface 122 of floor liner structure 120. The bottom surfaces 128 and 130 of storage cavities 104' and 106' should be capable of being the support of cargo thereon.

In FIG. 11, wall members 4a' and 4b' have been rotated 90 degrees to respective upright deployed positions. Hinge or pivot assemblies 140 and 142 are such that wall members 4a' and 4b' can rotate by 90 degrees (as shown by arrows 132 and 134 in FIG. 11) to the upright deployed positions that are secured using appropriate coupler members.

Having described the apparatus of the present invention, the method of the present invention is briefly set forth.

<Method>

A method of providing a cargo pocket in a vehicle 102 having, within a passenger compartment 100, a space S between two seats 1 and 2, is provided. The method comprises stowing two wall members (4a, 4b; 4a', 4b') in storage cavities (104, 106; 104', 106') near the floor 98 level of the passenger compartment (100); deploying one of the two wall members (4a; 4a') into the passenger compartment 100 to form a first partition wall between the two seats 1 and 2; and deploying the other wall member (4b, 4b') into the passenger compartment to form a second partition wall between the two seats 1 and 2. The first and second partition walls provide a cargo pocket for vehicle occupants sitting in the two seats 1 and 2.

In the drawings and specification, there have been disclosed typical preferred exemplary embodiments of the invention and, although specific terms are employed, they are used in a generic and descriptive sense only and not for the purpose of limitation, the scope of the invention being set forth in the following claims.

What is claimed is:

1. A stowable wall assembly in combination with a vehicle having two adjacent seats spaced from each other to define therebetween a space within a passenger compartment, the assembly comprising:
at least two wall members adapted to be stowed in respective storage positions, each of the wall members being configured to have a deployed position extending into the passenger compartment to provide a partition wall for the space.

2. The assembly as claimed in claim 1,
wherein each of the wall members is a flexible wall member that is rolled up on an axle, which is mounted under a floor of the passenger compartment between the two seats,
wherein each of the flexible wall members has a handle thereon along an edge thereof,
wherein the assembly further comprises attachment support coupler members, and
wherein each of the handles has protruding coupler members for engagement with the attachment support coupler members to retain the flexible wall member in the deployed position after the flexible wall member is unrolled.

3. The assembly as claimed in claim 2,
wherein the two seats have surfaces, respectively, which face each other across the space, and
wherein each of the attachment support coupler members includes aperture means formed in one of the surfaces of the two seats.

4. The assembly as claimed in claim 2,
wherein the two seats have surfaces, respectively, which face each other across the space, and
wherein the two seats have seat side covers, and
wherein each of the attachment support coupler members forms an integral part of one of the seat side covers and includes aperture means formed in that portion of the one seat side cover which covers one of the surfaces of the two seats.

5. The assembly as claimed in claim 4, wherein the aperture means of each of the attachment support coupler members include a plurality of apertures formed in the one seat side cover and located in line along directions in which the partition walls face each other.

6. The assembly as claimed in claim 4,
wherein the protruding coupler members of each of the handles are pivotable between a horizontally oriented position and an downwardly angled position, and
wherein each of the aperture means of each of the attachment support coupler members provides a cylindrical bearing surface that extends along an upwardly angled line to catch one of the protruding coupler members as downwardly angled.

7. The assembly as claimed in claim 5, wherein
the plurality of apertures communicate one after another via ribs that are configured for restricting free movement of the corresponding one of the handles between the adjacent two of the plurality of apertures.

8. The assembly as claimed in claim 2, wherein
one of the handles is a rod-like member formed with a slot-like opening allowing passage of the corresponding one of the flexible wall members, and
the assembly further comprises a secondary rod-like end member at the edge of the corresponding one flexible wall member, the secondary rod-like end member being provided with a hook for engagement with the other handle.

9. The assembly as claimed in claim 8, wherein
the one handle also includes a fastening device made of cloth for connection with the secondary rod-like end member.

* * * * *